US008325970B2

(12) United States Patent
Ishikawa et al.

(10) Patent No.: US 8,325,970 B2
(45) Date of Patent: Dec. 4, 2012

(54) APPARATUS, METHOD, AND COMPUTER PRODUCT FOR IMAGE PROCESSING

(75) Inventors: Masaaki Ishikawa, Tokyo (JP); Yasushi Abe, Kanagawa (JP); Masaichi Niro, Kanagawa (JP); Hiroshi Shimura, Kanagawa (JP); Taeko Ishizu, Saitama (JP); Motohiro Kuroda, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 996 days.

(21) Appl. No.: 12/076,393

(22) Filed: Mar. 18, 2008

(65) Prior Publication Data

US 2008/0232639 A1    Sep. 25, 2008

(30) Foreign Application Priority Data

Mar. 19, 2007  (JP) ................. 2007-070882
Feb. 27, 2008  (JP) ................. 2008-046363

(51) Int. Cl.
*G06K 9/00* (2006.01)
*H04N 1/40* (2006.01)
(52) U.S. Cl. ................... 382/100; 358/3.28
(58) Field of Classification Search ............ 382/100, 382/282; 358/3.28
See application file for complete search history.

(56) References Cited

U.S. PATENT DOCUMENTS

| | | | |
|---|---|---|---|
| 6,181,802 B1 * | 1/2001 | Todd | 382/100 |
| 6,289,131 B1 | 9/2001 | Ishikawa | |
| 6,580,804 B1 | 6/2003 | Abe | |
| 6,580,806 B1 * | 6/2003 | Sato | 382/100 |
| 6,741,722 B2 | 5/2004 | Abe | |
| 6,901,236 B2 | 5/2005 | Saitoh et al. | |
| 6,912,069 B1 * | 6/2005 | Matsunoshita | 358/3.28 |
| 7,139,429 B2 | 11/2006 | Shimura | |
| 7,140,534 B2 | 11/2006 | Miyazawa et al. | |
| 7,593,542 B2 * | 9/2009 | Abe et al. | 382/100 |
| 7,742,196 B2 * | 6/2010 | Uchida et al. | 358/3.28 |
| 2001/0048802 A1 * | 12/2001 | Nakajima et al. | 386/46 |
| 2002/0181025 A1 * | 12/2002 | Yamaguchi | 358/3.28 |
| 2003/0044043 A1 * | 3/2003 | Kaneda | 382/100 |
| 2003/0081779 A1 * | 5/2003 | Ogino | 380/207 |
| 2003/0204812 A1 * | 10/2003 | Hayashi | 715/500 |
| 2004/0131265 A1 | 7/2004 | Yagishita et al. | |
| 2004/0148261 A1 | 7/2004 | Abe | |
| 2004/0174567 A1 | 9/2004 | Abe et al. | |

(Continued)

FOREIGN PATENT DOCUMENTS

EP          1 509 034       2/2005

(Continued)

OTHER PUBLICATIONS

European Search report dated Jun. 25, 2008.

(Continued)

*Primary Examiner* — Chan S Park
*Assistant Examiner* — Avinash J Yentrapati
(74) *Attorney, Agent, or Firm* — Harness, Dickey & Pierce, P.L.C.

(57) ABSTRACT

An image processing apparatus includes an obtaining unit, an area setting unit, and an adding unit. The obtaining unit obtains an adding method by which additional information is to be added to image data containing content information. The area setting unit sets an additional-information area to which the additional information is to be added based on the adding method and the content information. The adding unit adds the additional information to the additional-information area by the adding method.

8 Claims, 9 Drawing Sheets

U.S. PATENT DOCUMENTS

| | | |
|---|---|---|
| 2004/0184065 A1 | 9/2004 | Guan et al. |
| 2004/0208339 A1 | 10/2004 | Abe et al. |
| 2004/0258276 A1 | 12/2004 | Ishii et al. |
| 2005/0041263 A1 | 2/2005 | Ishikawa et al. |
| 2005/0052682 A1 | 3/2005 | Ishikawa et al. |
| 2005/0078331 A1 | 4/2005 | Guan et al. |
| 2005/0100671 A1* | 5/2005 | Kawada et al. ............... 427/256 |
| 2005/0151989 A1 | 7/2005 | Shimura et al. |
| 2005/0151990 A1 | 7/2005 | Ishikawa et al. |
| 2005/0152006 A1 | 7/2005 | Abe et al. |
| 2005/0180596 A1 | 8/2005 | Abe et al. |
| 2005/0190948 A1* | 9/2005 | Isogai ............................ 382/100 |
| 2006/0007500 A1 | 1/2006 | Abe et al. |
| 2006/0067561 A1* | 3/2006 | Matsubara ..................... 382/100 |
| 2006/0072782 A1 | 4/2006 | Abe et al. |
| 2006/0077419 A1* | 4/2006 | Sugiura et al. ................ 358/1.14 |
| 2006/0078159 A1* | 4/2006 | Hamatake et al. ............. 382/100 |
| 2006/0126098 A1 | 6/2006 | Shimura et al. |
| 2006/0133645 A1* | 6/2006 | Rhoads et al. ................ 382/100 |
| 2006/0164693 A1 | 7/2006 | Matsumoto et al. |
| 2006/0165257 A1* | 7/2006 | Yamaguchi et al. .......... 382/100 |
| 2006/0256362 A1 | 11/2006 | Guan et al. |
| 2006/0279792 A1 | 12/2006 | Ishizu et al. |
| 2007/0003341 A1 | 1/2007 | Guan et al. |
| 2007/0030521 A1* | 2/2007 | Fujii et al. ..................... 358/3.28 |
| 2007/0092103 A1* | 4/2007 | Mihcak et al. ................ 382/100 |
| 2007/0153303 A1 | 7/2007 | Abe et al. |
| 2007/0177762 A1* | 8/2007 | Matsumoto ..................... 382/100 |
| 2007/0297644 A1 | 12/2007 | Ishikawa et al. |
| 2008/0080738 A1* | 4/2008 | Takahashi et al. ............. 382/100 |
| 2008/0162163 A1* | 7/2008 | Sharma et al. ..................... 705/1 |
| 2009/0172404 A1* | 7/2009 | Kim et al. ..................... 713/176 |

FOREIGN PATENT DOCUMENTS

| | | |
|---|---|---|
| EP | 1 628 466 | 2/2006 |
| EP | 1628466 A1 * | 2/2006 |
| JP | 09-106272 | 4/1997 |
| JP | 2695523 | 9/1997 |
| JP | 2003-110827 | 4/2003 |
| JP | 2004166018 A * | 6/2004 |
| JP | 2004-274092 | 9/2004 |
| JP | 3837999 | 8/2006 |
| JP | 2006-345383 | 12/2006 |

OTHER PUBLICATIONS

Abstract of JP 2001-346032 published on Dec. 14, 2001.
Abstract of JP 04-170569 published on Jun. 18, 1992.

* cited by examiner

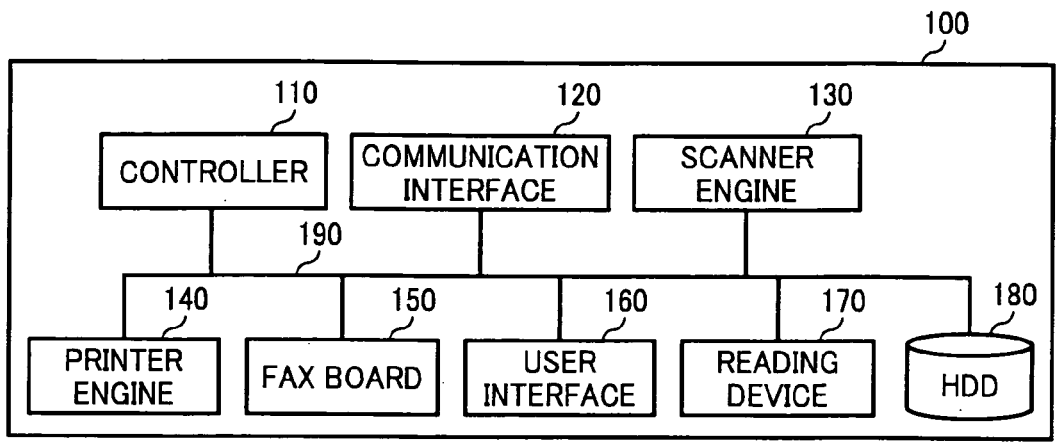
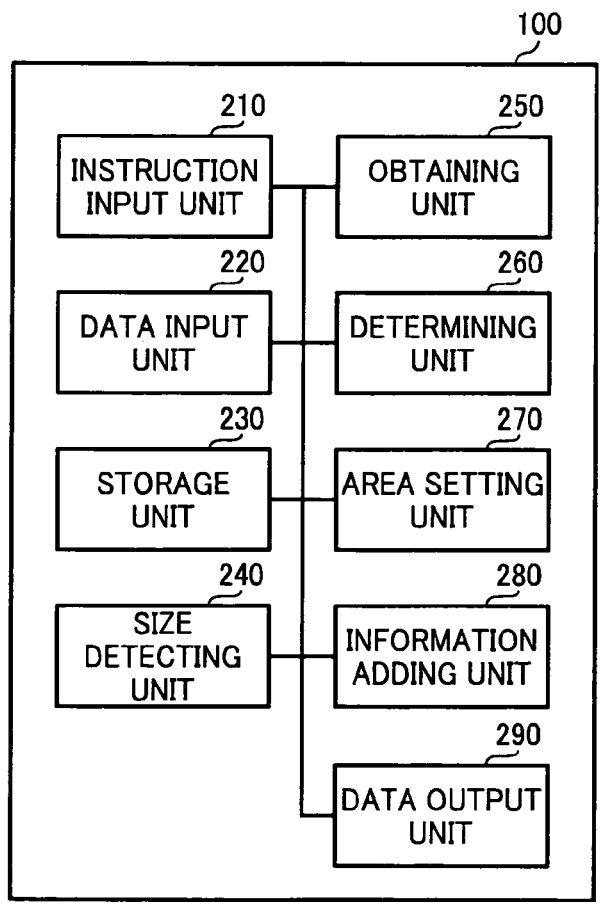

FIG. 3

| IDENTIFICATION INFORMATION | ADDITIONAL INFORMATION | TYPE |
|---|---|---|
| 001 | BARCODE | CODING METHOD |
| 002 | TWO-DIMENSIONAL BARCODE | CODING METHOD |
| 003 | DOT PATTERN | CODING METHOD |
| 004 | SLASH PATTERN | CODING METHOD |
| 005 | WATERMARK PATTERN | WATERMARK METHOD |
| 006 | . | . |
| 007 | . | . |
| 008 | . | . |
| 009 | . | . |
| 010 | . | . |
| 011 | | |
| 012 | | |
| | | |

FIG. 6
| SHAPE INSTRUCTION | |
|---|---|
| 001 | 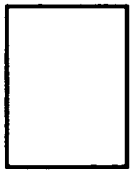 |
| 002 |  |
| 003 |  |
| 004 | 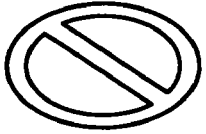 |
| 005 |  |
| 006 |  |
| 007 | . |
| 008 | . |

| ADDITIONAL INFORMATION | ADDING-METHOD IDENTIFICATION INFORMATION |
|---|---|
| Data_20080215001 | 001, 005 |
| Data_20080215002 | 002, 005 |
| Data_20080306003 | 002, 005 |
| Data_19781204006 | 004, 005 |
| Data_19800306001 | 004, 005 |
| | |
| | |

APPARATUS, METHOD, AND COMPUTER PRODUCT FOR IMAGE PROCESSING

CROSS-REFERENCE TO RELATED APPLICATIONS

The present application claims priority to and incorporates by reference the entire contents of Japanese priority documents 2007-070882 filed in Japan on Mar. 19, 2007 and 2008-046363 filed in Japan on Feb. 27, 2008.

BACKGROUND OF THE INVENTION

1. Field of the Invention

The present invention relates to an apparatus, a method, and a computer product for image processing.

2. Description of the Related Art

With development in technologies for image processing in recent years, it becomes possible to produce a copy that cannot be easily distinguished from an original. To prevent forgery of specific documents such as bank notes and marketable securities, there is an increasing demand for technologies for preventing copying or producing a perfect copy of such documents.

Under the circumstances, various technologies have been proposed for regulating copying of specific or confidential documents.

For example, Japanese Patent Application Laid-open No. 2004-274092 discloses a conventional technology for inhibiting copying of image data by adding copy prohibition information to the image data using a dot pattern. In the conventional technology, when a dot pattern that has an amount of characteristics equal to that of a copy prohibition pattern previously stored is detected from image data, it is determined that the image data is prohibited from being copied.

Another conventional technology has been proposed that uses a dot pattern as a watermark pattern. The watermark pattern is a recognizable character string or image that appears on a copy of image data, and is formed of dots having a predetermined diameter visible on the copy and dots having a predetermined diameter invisible on the copy.

However, if such a dot pattern that prohibits output of image data is superimposed on the entire image data containing content such as text data and photographic data, visibility or appearance of the content printed on the copy decreases (see FIG. 14).

Adding such dot pattern as copy prohibition information to image data is useless if the copy prohibition information is not extracted with predetermined accuracy regardless of conditions for reading and outputting the image data. Therefore, the dot pattern to be superimposed on the image data needs to have a predetermined amount of density or luminance. To use a dot pattern as a watermark pattern, it suffices that the dot pattern added to image data includes two types of dots having different diameters. In this case, it is desirable that the dot pattern to be added to the image data have the minimum density (luminance) to prevent decrease in the visibility of the content information.

SUMMARY OF THE INVENTION

It is an object of the present invention to at least partially solve the problems in the conventional technology.

According to an aspect of the present invention, there is provided an image processing apparatus including an obtaining unit that obtains an adding method by which additional information is to be added to image data containing content information; a setting unit that sets an area to which the additional information is to be added based on the adding method and the content information; and an adding unit that adds the additional information to the area by the adding method.

According to another aspect of the present invention, there is provided an image processing method including obtaining an adding method by which additional information is to be added to image data containing content information; setting an area to which the additional information is to be added based on the adding method and the content information; and adding the additional information to the area by the adding method.

According to still another aspect of the present invention, there is provided a computer program product that implements the above method on a computer.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a block diagram of a hardware configuration of an image processing apparatus according to a first embodiment of the present invention;

FIG. 2 is a functional block diagram of the image processing apparatus shown in FIG. 1;

FIG. 3 is a table of an example of data stored in a storage unit shown in FIG. 1;

FIG. 6 is a table of relation between shape instruction and template that are stored in the storage unit shown in FIG. 1;

DETAILED DESCRIPTION OF THE PREFERRED EMBODIMENTS

Figure 4:
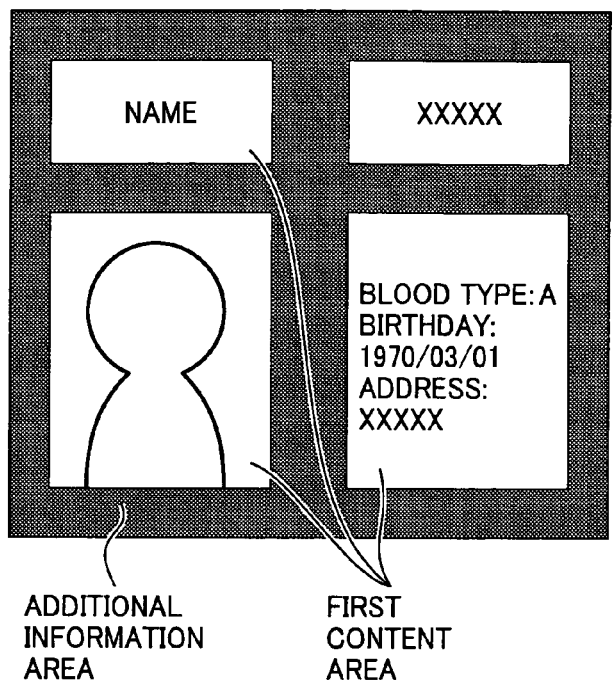
FIG. 4 is a schematic diagram of an example of image data in which an additional information area is set based on a first content area.

Exemplary embodiments of the present invention are explained in detail below with reference to the accompanying drawings.

In the following embodiments, an image processing apparatus is explained as a multifunction product (MFP) that combines any or all of functions of, for example, a copier, a facsimile (FAX) machine, a scanner, and a printer. However, the image processing apparatus can be, for example, a FAX machine, a printer, a personal computer (PC), a game machine, a mobile phone, and a car navigation system.

The term "content information" as used herein refers to various types of contents of image data. The contents include text, a character string, a diagram, a chart, and a photographic image.

The term "coding method" as used herein refers to a method in which each bit of information represented by a bit string is converted into a predetermined pattern and the pattern is added as additional information to image data. The conversion into the pattern can be referred to as "coding". The pattern is in a format that can be recognized as code information such as a dot pattern (":" or ". ."), a slash pattern ("/" or "\"), a barcode, or a two-dimensional barcode (quick response (QR) code). If the information is analog data, the "coding method" includes conversion into digital data (bit string).

The term "watermark method" as used herein refers to a method using a pattern including two types of patterns. One of the patterns in a predetermined size is printed on a copy of an original image while the other in a different size is not printed on the copy, so that the pattern can be printed on the copy as visible information. Detailed explanation of the watermark method is given in Japanese Application Laid-open No. 2004-274092, which is incorporated herein by reference.

FIG. 1 is a block diagram of a hardware configuration of an MFP 100 as an image processing apparatus according to a first embodiment of the present invention. The MFP 100 includes a controller 110, a communication interface 120, a scanner engine 130, a printer engine 140, a FAX board 150, a user interface 160, a reading device 170, a hard disk drive (HDD) 180, and a bus 190.

The controller 110 controls the MFP 100. The controller 110 includes a central processing unit (CPU) 111, a read only memory (ROM) 112, and a main memory 113 that forms an area for temporarily storing various types of data.

The communication interface 120 is controlled by the controller 110, so that the MFP 100 can communicate with an external device. The communication interface 120 can be, for example, an Ethernet (trademark) interface or an IEEE1284 interface.

The scanner engine 130 controlled by the controller 110 performs an image reading process.

The printer engine 140 controlled by the controller 110 performs an image forming process (image printing process). The printer engine 140 can be applied to, for example, a laser beam printer or an ink-jet printer.

The FAX board 150 controlled by the controller 110 performs a FAX communication process.

The user interface 160 displays information sent from the controller 110 and sends information input by a user to the controller 110. In other words, the user interface 160 outputs (provides) information to the user and receives an instruction (information) from the user. The user interface 160 includes, for example, a display such as a liquid crystal display (LCD) or a cathode ray tube (CRT) display, a pointing device (mouse, stylus pen, etc.), and a keyboard. A touch panel or an audio interface can be alternatively employed.

The reading device 170 controlled by the controller 110 performs a process for reading information from a portable recording medium (not shown) such as an integrated circuit (IC) card or a flexible disk. The reading device 170 accesses the portable recording medium in response to an instruction from the controller 110, reads information therefrom, and sends the information to the controller 110.

Various types of data is written to and read from the HDD 180. The bus 190 electrically connects the controller 110, the communication interface 120, the scanner engine 130, the printer engine 140, the FAX board 150, the user interface 160, the reading device 170, and the HDD 180. The bus 190 can be an address bus, a data bus, or the like.

A printing job is issued by selecting the printer engine 140, and a scanning job is issued by selecting the scanner engine 130. By selecting both of the printer engine 140 and the scanner engine 130, both of the printing job and the scanning job are issued. In addition, by selecting the printer engine 140, the scanner engine 130, and the FAX board 150, a FAX reception job and a FAX transmission job are issued.

FIG. 2 is a functional block diagram of the MFP 100. The MFP 100 includes an instruction input unit 210, a data input unit 220, a storage unit 230, a size detecting unit 240, an obtaining unit 250, a determining unit 260, an area setting unit 270, an information adding unit 280, and a data output unit 290.

The instruction input unit 210 receives an instruction from the user who operates the MFP 100. The instruction is, for example, an input instruction for inputting image data, an output instruction for outputting image data, a condition setting instruction for setting conditions for inputting or outputting image data, or an information adding instruction for adding additional information. The instruction input unit 210 can employ a system in which an option menu is displayed to the user so that the user can selects one or a plurality of menu items as instruction. If the user remotely controls the MFP 100 via an external device, the communication interface 120 serves as the instruction input unit 210.

The data input unit 220 receives input of image data to which information is to be added (i.e., target image data). The target image data is generated by the data input unit 220 with an application or received from an external device via the communication interface 120 or the scanner engine 130, and is stored in the storage unit 230.

The data input unit 220 inputs information to be added (hereinafter, "additional information") to the target image data. The additional information is generated or obtained by the data input unit 220 and stored in the storage unit 230. The additional information includes information representing that image data is prohibited from being copied (hereinafter, "copy inhibition information"), security information such as identification information of an apparatus from which image data is to be output, information for managing copyright of image data, and information on image data such as an uniform resource locator (URL) that indicates where the information exists. The copy inhibition information is, for example, a character string "COPY INHIBITED" or a bit string representing that copying the image data is inhibited. The data input unit 220 can be realized by the communication interface 120 or the scanner engine 130.

The data input unit 220 can receive information selected by the user via the instruction input unit 210 as additional information or retrieve additional information corresponding to a condition setting instruction issued by the user from the storage unit 230. Given below are examples of the additional information corresponding to the condition setting instruction issued by the user.

Assume that a user wishes to increase efficiency of using image data and the security level of the image data by adding various types of information to the image data depending on purposes and the type of the image data. In such a case, when the user selects a confidential data output mode to output the image data, the copy inhibition information is added as the additional information to the image data. Because of the copy inhibition information added to the image data, when a device reads the image data for copying the image data, the device can recognize that the image data is inhibited from being copied. Thus, the processes for copying the image data can be stopped.

A security instruction issued by an administrator of the MFP 100 is another example of the condition setting instruction. When the security instruction is selected by the administrator, the identification information of the MFP 100 that outputs the image data and the identification information of the user, or tracking information such as date of outputting the image data, is added to the image data as additional information. Because the identification information of the MFP 100 is added to the image data, it is possible to know when, by which device, and by whom the image data is output.

The storage unit 230 stores therein various types of information necessary for the process performed by the MFP 100. The information includes information on an area to which the additional information is to be added (hereinafter, "additional information area") and various types of information input through the data input unit 220. The information on the additional information area represents a range of the additional information area (hereinafter, "area range information"). The storage unit 230 is realized by the memory 113 or the HDD 180.

The size detecting unit 240 detects a size of the image data input through the data input unit 220. The size detecting unit 240 detects, for example, a sheet size such as A3 or A4, or a size of the image data which is defined by an image resolution. The size detecting unit 240 can be realized by the controller 110 or the scanner engine 130.

The obtaining unit 250 obtains the identification information of a method by which the additional information is to be added to the additional information area of the image data (hereinafter, "adding method"). Specifically, the obtaining unit 250 obtains identification information of, for example, an adding method recorded in the header of the image data or page description language (PDL) data that is stored in the storage unit 230, an adding method selected via the instruction input unit 210, or an adding method stored in the storage unit 230. Instead of the identification information of the adding method (adding-method identification information), the obtaining unit 250 can obtain the adding method. The obtaining unit 250 can be realized by the communication interface 120, the user interface 160, or the controller 110.

The determining unit 260 determines the type of, for example, the adding method obtained by the obtaining unit 250. Specifically, the determining unit 260 refers to the storage unit 230 and determines the type using the adding-method identification information as a key. FIG. 3 is examples (a table) of types of adding method stored in the storage unit 230. The types of adding method include the "coding method" and the "watermark method". A significant difference between the coding method and the watermark method is on whether additional information added to image data can be recognized as code information by an apparatus. In other words, the determining unit 260 determines whether the additional information is to be added to the image data in a format that can be recognized as code information.

The area setting unit 270 sets the additional information area in image data based on the adding method and content information contained in the image data. The area setting unit 270 is realized by the controller 110.

The area setting unit 270 is explained in detail below. The area setting unit 270 obtains an area where the content information contained in the target image data and stored in the storage unit 230 exists (hereinafter, "content area"). A circumscribed rectangle of the content information can be obtained as the content area. The circumscribed rectangle of the content information can be obtained by specifying a background color of the image data and extracting a circumscribed rectangle of pixels other than those of the background color. The background color can be specified, for example, in a way that a color histogram of the image data is generated and a color occupying the largest area in the histogram is specified as the background color.

The area setting unit 270 sets the additional information area in the area of the image data based on the content area and information on whether the adding method is the coding method. The area of the image data can be determined by the size detected by the size detecting unit 240. The additional information area can also be set based on the adding method and the content area in a memory (not shown) of the controller 110 regardless of the area of the image data.

In many cases, additional information needs to be added with predetermined accuracy to image data as coding information not to be lost from the image data, such as a copy prohibition code, trace information for administering a record of image processing, and a URL for integrating a paper sheet and electric information. Therefore, when the additional information is added to the image data by the coding method, it is preferable that the additional information be added as code information that is recognizable with predetermined accuracy even if image processing for, for example, copying or noise correction is performed on the image data. For this reason, when the coding method is employed, the additional information needs to be added to the image data in a pattern with a predetermined density or luminance. Therefore, when the coding method is used as the adding method, the area setting unit 270 sets as the additional information area an area not overlapping the content area. This keeps the predetermined level of visibility or appearance of the content information of the image data on which the pattern having the predetermined density or the luminance is superimposed.

This does not apply to the case where the additional information is added to the image data by a method other than the coding method. For example, when the watermark method is employed, the meaning of adding the additional information to the image data may be increased by superimposing the additional information on the content information. Therefore, when the additional information is added to the image data by a method other than the coding method, the area setting unit 270 sets the additional information area to an area that overlaps the content area.

The content area is not limited to the circumscribed rectangle of the content information. For example, the content area can be obtained by performing an outline tracing process on the image data.

Alternatively, the additional information area can be set based on a content area obtained from a histogram of pixel values of the image data. The histogram of pixel values is obtained from that of an end portion of the image data. It is determined that a portion with an amount of variation above a predetermined threshold is an edge of the content information. An area extending from the end portion of the image data to the edge of the content information is set as the additional information area.

The edge of the content information can be detected also based on a derivative of each pixel of the image data, and the area extending from the edge of the content information thus obtained and the edge portion of the image data can be set as the additional information area. The derivative can be calculated by a generally-used method such as the image filtering.

Figure 5:
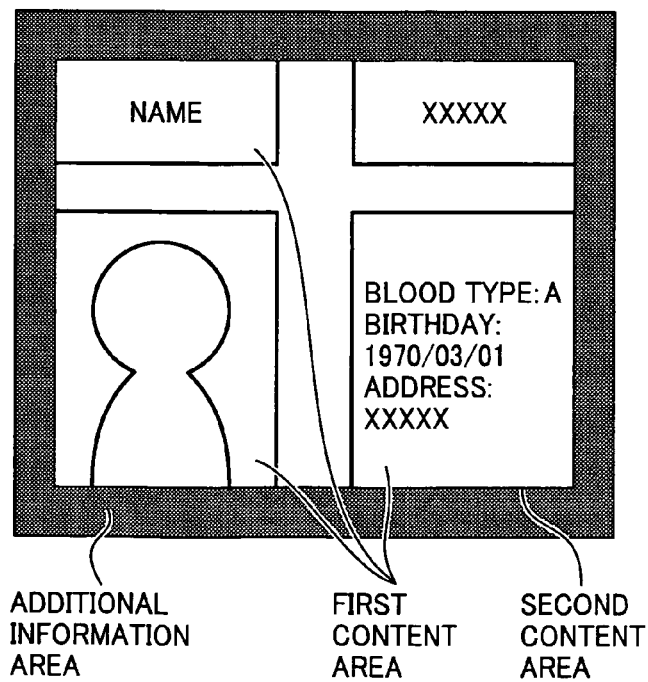
FIG. 5 is a schematic diagram of an example of image data in which an additional information area is set based on a second content area.

If a plurality of content areas (first content areas) exists, the additional information area can be set depending on an area (second content area) that covers all the first content areas. Specifically, the first content areas are all integrated to obtain the second content area, and then, a circumscribed rectangle of the second content area is obtained. An area around the circumscribed rectangle is set as the additional information area. In this case, no additional information is present in the content area. In other words, it is possible to achieve imaged data containing content information with visibility or appearance kept at an original level. However, a wider additional information area can be ensured and a larger amount of additional information can be added to the image data with the method in which the additional information area is set based on the first content areas. FIG. 4 is an example of the image data to which the additional information is added based on the first content areas, and FIG. 5 is schematic diagram of an example of the image data to which the additional information is added based on the second content area.

The area setting unit 270 can be configured to set the additional information area in consideration of an instruction for a shape of the additional information area (hereinafter, "area shape"). By setting the additional information area in the content area based on the area shape, it is possible to set the additional information area having a shape predetermined by the user. Specifically, the area setting unit 270 obtains, from the storage unit 230, a template corresponding to an instruction for the area shape (hereinafter, "shape instruction") input via the instruction input unit 210 and stored in the storage unit 230, and sets the additional information area in the predetermined shape based on the template. FIG. 6 is a table of relation between the shape instruction and the template.

The information adding unit 280 converts the additional information input via the data input unit 220 into a predetermined pattern depending on the adding method obtained by the obtaining unit 250. By superimposing the pattern thus obtained on the additional information area set by the area setting unit 270, the additional information is added to the target image data.

Explained below is the conversion from the additional information into the pattern performed by the information adding unit 280.

When the obtaining unit 250 obtains the coding method as the adding method, the information adding unit 280 converts each bit of a bit string corresponding to the additional information obtained by the data input unit 220 into a pattern using the information stored in the storage unit 230, and superimposes the pattern on the image data. Specifically, the additional information is obtained on a bit basis, and then, a bit string thus obtained is rearranged into a two-dimensional string in a predetermined size (hereinafter, "two-dimensional array unit"). By arranging the unit two-dimensional array in lateral direction and a longitudinal direction repeatedly, the information adding unit 280 generates a two-dimensional bit array in the size detected by the size detecting unit 240. A part of the two-dimensional bit array that overlaps the additional information area set by the area setting unit 270 is converted into a pattern of each two-dimensional array unit. Thus, the pattern is superimposed on the image data. To improve accuracy of extracting the additional information, a bit string successively representing the same additional information can be converted into a pattern.

Subsequently, a case where the obtaining unit 250 obtains an adding method other than the coding method, for example, the watermark method is explained. The information adding unit 280 converts the additional information obtained by the data input unit 220 to raster data and generates a binary image as additional information image data. Furthermore, the information adding unit 280 generates a watermark pattern by replacing black pixels of the additional information image data thus generated with a pattern having a size that is not printed on the copy and replacing white pixels of the additional information image data with a pattern having a size that is printed on the copy. Alternatively, the information adding unit 280 can generate a watermark pattern by replacing the black pixels with a pattern having a size that can be printed on a copy and replacing the white pixels with a pattern having a size that cannot be printed on the copy. By superimposing the watermark pattern on the additional information area, the additional information is added to the target image data.

The data output unit 290 is explained below. The data output unit 290 outputs the image data to which the additional information is added (i.e., the image data containing the additional information). The image data can be output to an external device via the communication interface 120, can be printed on a predetermined recording medium through the printer engine 140, or can be displayed on a panel through the user interface 160.

Figure 7:
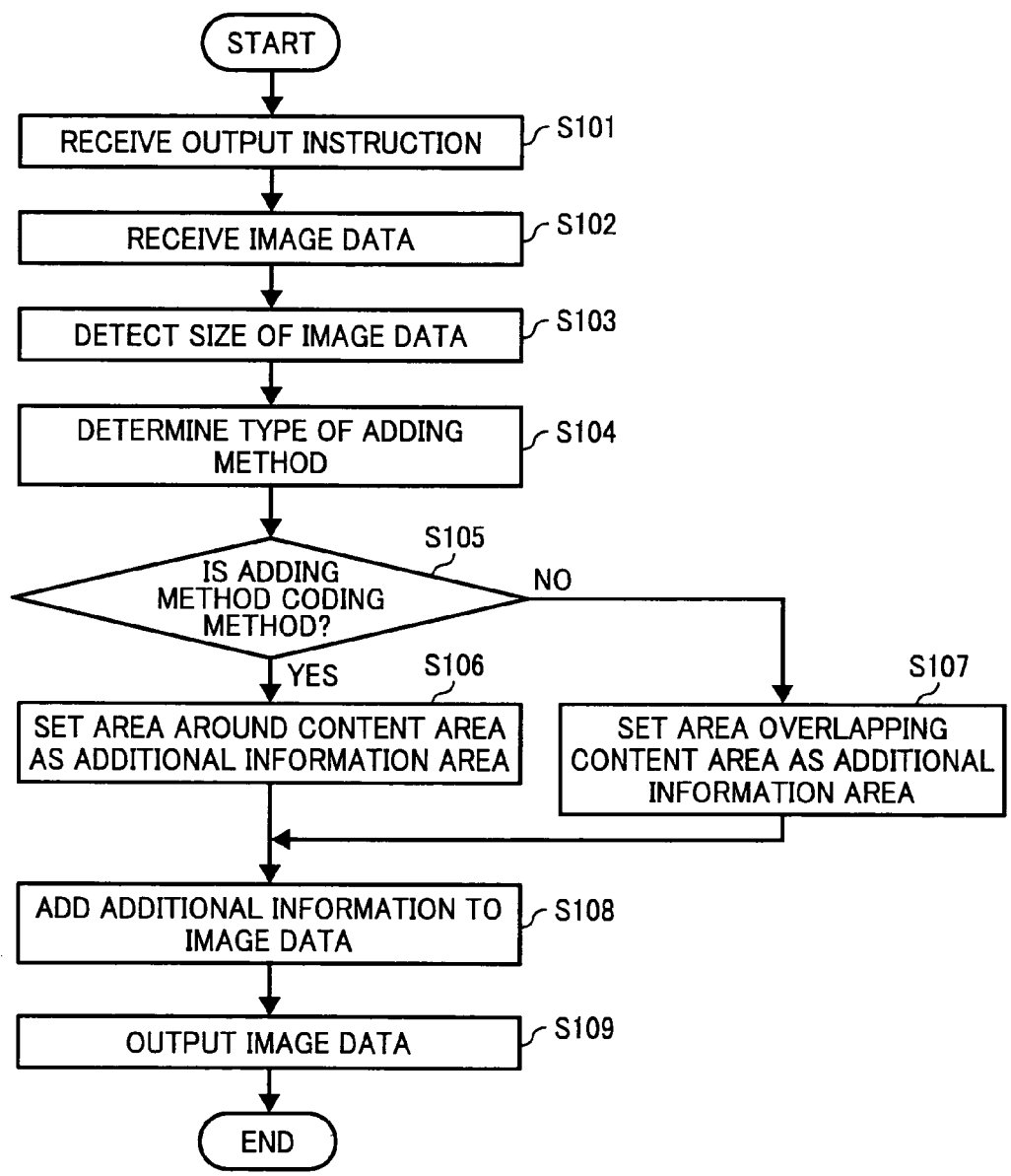
FIG. 7 is a flowchart of the operation of the image processing apparatus shown in FIG. 1.

FIG. 7 is a flowchart of the operation of the MFP 100. The instruction input unit 210 receives an output instruction from a user (step S101). The instruction input unit 210 receives an instruction for adding additional information to image data from the user in addition to an output instruction.

The data input unit 220 receives the image data to be processed and to which the additional information is to be added (step S102), and the image data is stored in the storage unit 230.

The size detecting unit 240 reads the image data from the storage unit 230, and detects the size of the image data (step S103). The information on the size of the image data is stored in the storage unit 230.

The obtaining unit 250 obtains identification information of an adding-method employed for adding the additional information to the image data, and the determining unit 260 determines the type of the adding method (step S104). The area setting unit 270 obtains a content area of the image data, and sets an additional information area based on content information and the type of the adding method.

Determination is made on whether the adding method is the coding method (step S105). When the adding method is the coding method (YES at step S105), an area around the content area is set as the additional information area (step S106).

On the other hand, when the adding method is a method other than the coding method (No at step S105), the area overlapping the content area is set as the additional information area (step S107).

The information adding unit 280 superimposes a pattern on the additional information area to add the additional information to the image data (step S108), and the data output unit 290 outputs the image data containing the additional information (step S109). Thus, the process is completed.

As explained above, according to the first embodiment, the area setting unit 270 sets an additional information area based on an adding method and content information of image data. Thus, it is possible to keep a predetermined level of visibility or appearance of the content information.

There is no particular limitation on the portable recording medium that is read by the reading device 170. As the portable recording medium, a memory such as a secure digital (SD) card, a compact flash (trademark) memory card, a smart media (trademark), a memory stick (trademark), and a picture card, and any other types of portable recording media can be used singly or in combination.

Each function explained above can be realized by a computer program that is written in a legacy programming language or an objective programming language such as an assembler, C, C++, C#, or Java (trademark). The computer program can be stored in a device-readable recording medium and distributed. The recording medium can be, for example, a ROM, an electrically erasable programmable read-only memory (EEPROM), an erasable programmable read-only memory (EPEOM), a flash memory, a flexible disk, a compact disk read only memory (CD-ROM), a compact disk read-write memory (CD-RW), a digital versatile disc (DVD), an SD card, or a magneto-optical (MO) disk.

A second embodiment of the present invention is explained below with reference to FIGS. 8 to 13. The second embodiment is different from the first embodiment in that additional information is added to image data to be processed (i.e., target image data) by a plurality of adding methods.

Figure 8:
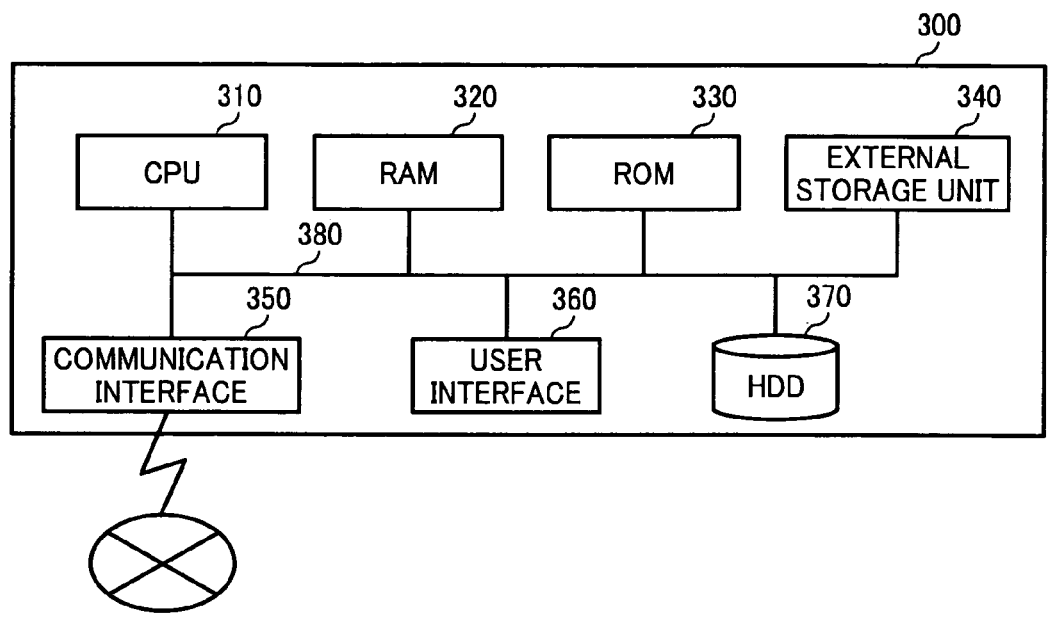
FIG. 8 is a block diagram of a hardware configuration of an image processing apparatus according a second embodiment of the present invention.

FIG. 8 is a block diagram of a PC 300 as an image processing apparatus according to the second embodiment. Explanation for constituent elements of the PC 300 having basically the same configuration and function as those of the MFP 100 are not repeated.

The PC 300 includes a CPU 310, a RAM 320, a ROM 330, and an external storage unit 340, a communication interface 350, a user interface 360, an HDD 370, and a bus 380.

The CPU 310 executes software such as an operating system (OS) and a print data generating program stored in the ROM 330, the external storage unit 340, or the HDD 370 and controls the devices connected to the bus 380. The RAM 320 functions as, for example, a working area that serves as a maim memory of the CPU 310. The external storage unit 340 and the HDD 370 stores therein, for example, a boot program, OS, and various types of applications.

The communication interface 350 controlled by the CPU 310 commutates with an external device. For example, the communication interface 350 can be, for example, an Ethernet (trademark) interface or an IEEE1284 interface.

The user interface 360 displays information sent from the CPU 310 and sends information input by a user to the CPU 310. In other words, the user interface 360 outputs (provides) an information to the user and inputs an instruction (information) from the user. The user interface 360 includes, for example, a display such as a LCD or a CRT, a pointing device such as a mouse or a stylus pen, and a keyboard. A touch panel or an audio interface can be alternatively employed.

The bus 380 electrically connects the CPU 310, the RAM 320, the communication interface 350, the user interface 360. The bus 380 can be an address bus, a data bus, or the like.

Figure 9:
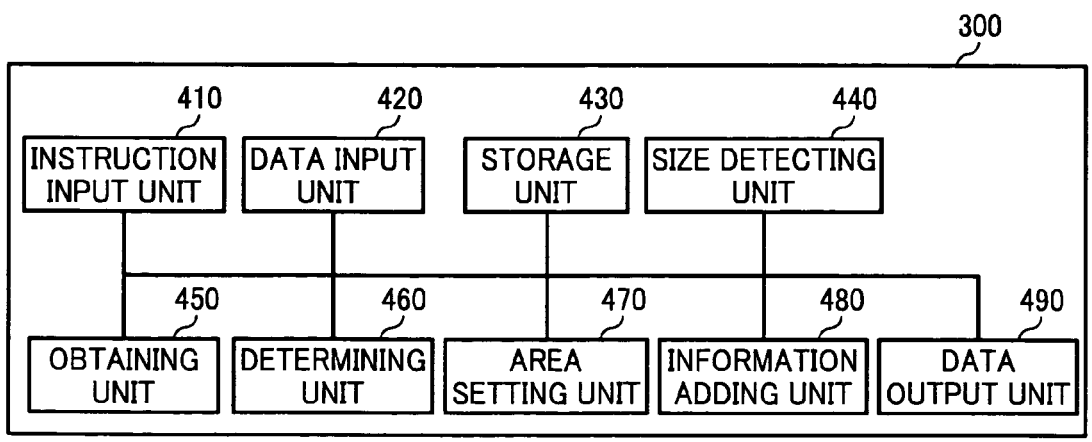
FIG. 9 is a functional block diagram of the image processing apparatus shown in FIG. 8.

FIG. 9 is a functional block diagram of the PC 300. The PC 300 includes an instruction input unit 410, a data input unit 420, a storage unit 430, a size detecting unit 440, an obtaining unit 450, a determining unit 460, an area setting unit 470, an information adding unit 480, and a data output unit 490.

The obtaining unit 450 and the area setting unit 470 that are different from the obtaining unit 250 and the area setting unit 270 are explained below. The functions of other units of the PC 300 are basically the same as those of the MFP 100 and the explanations thereof are not repeated.

The obtaining unit 450 obtains identification information of an adding method by which additional information is to be added to image data. Specifically, the identification information is on, for example, an adding method contained in the header of the image data and PDL data that are stored in the storage unit 430, an adding method selected via the instruction input unit 410, or an adding method stored in the storage unit 430. Instead of the identification information of the adding method (adding-method identification information), the adding method can be received. The obtaining unit 450 can be realized by the communication interface 350, the user interface 360, or the CPU 310.

Figures 10, 11:
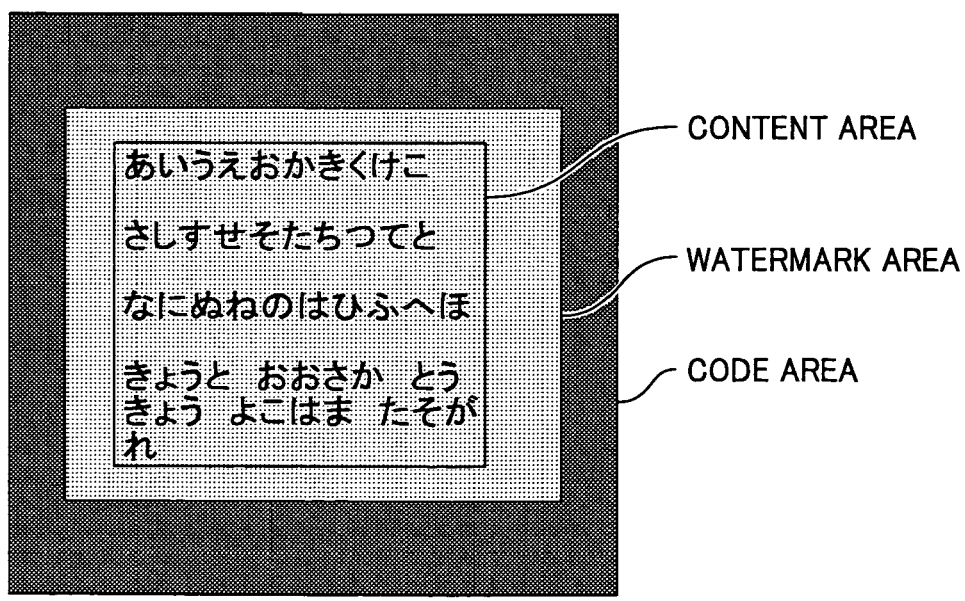
FIG. 10 is a table of an example of data stored in a storage unit shown in FIG. 8.
FIG. 11 is a schematic diagram of an example of image data to which additional information is added.

When the data input unit 420 receives a plurality of types of additional information, the obtaining unit 450 obtains the identification information of each adding method by which each type of additional information is to be added to the image data. The identification information and the additional information are stored in association in the storage unit 430. FIG. 10 is a table of an example of additional information and adding method stored in the storage unit 430 in association.

Even when the data input unit 420 receives a single type of additional information, the obtaining unit 450 can obtain a plurality of types of identification information of a plurality of adding methods. In this case, the process can be started in response to an instruction for adding additional information by a plurality of methods, which is input via the instruction input unit 210, or it can be determined whether to obtain the adding methods depending on a security level set via the instruction input unit 210.

The area setting unit 470 is explained below. The area setting unit 470 sets an additional information area in the image data based on the adding method by which the additional information is to be added to the image data and content information contained in the image data. The area setting unit 470 is realized by the CPU 310.

More specifically, the area setting unit 470 obtains a content area where the content information contained in the target image data stored in the storage unit 430 exists. The content area can be obtained by obtaining a circumscribed rectangle of the content information. The circumscribed rectangle of the content information specifies a background color of the image data, which is obtained by extracting a circumscribed rectangle of pixels other than those corresponding to the background color. To specify the background color, various types of methods can be employed. For example, a color histogram of the image data is generated, and it is determined that a color occupying the largest area is the back ground color based on the histogram.

The method of obtaining the content area is not limited to obtaining the circumscribed rectangle of the content information. For example, an outline tracing process can be performed on the image data to obtain the content area and the additional information area is set based on the content area thus obtained.

Alternatively, the additional information area can be set based on a content area obtained based on a histogram of a pixel value of the image data. The histogram of pixel value is obtained from an end portion of the image data. It is determined that a portion with an amount of variation above a predetermined threshold is an edge of the content information. An area ranging from the end portion of the image data to the edge of the content information is set as the additional information area.

The edge can be determined based on a derivative of each pixel of the image data as well, and the area ranging from the edge of the content information thus obtained and the edge portion of the image data can be set as the additional information area. The derivative can be obtained by a generally-used method such as image filtering.

The area setting unit 470 obtains the adding method of each type of additional information stored in the storage unit 430, and sets an additional information area range representing whether an area overlapping the content area is set as the additional information area based on the adding method received by the area setting unit 470. Furthermore, the additional information area is set in the image data based on the additional information area range and the content area. If the area setting unit 470 obtains the "coding method" and the "watermark method" as the adding method, an area that overlaps the content information is set as an area of the image data to which the additional information is added by the watermark method (hereinafter, "watermark area"), and an area around the watermark area and not overlapping the content area is set as an area of the image data to which the additional information is added by the coding method (hereinafter, "code area").

FIG. 11 is a schematic diagram of an example of image data in which an area around the watermark area and not overlapping the content area is set as the code area. By setting the area around the watermark area and not overlapping the content area as the code area, a predetermined level of visibility of the content area of the image data containing the additional information can be kept. In addition, the additional information can be easily scanned, so that the additional information can be promptly detected.

Figure 12:
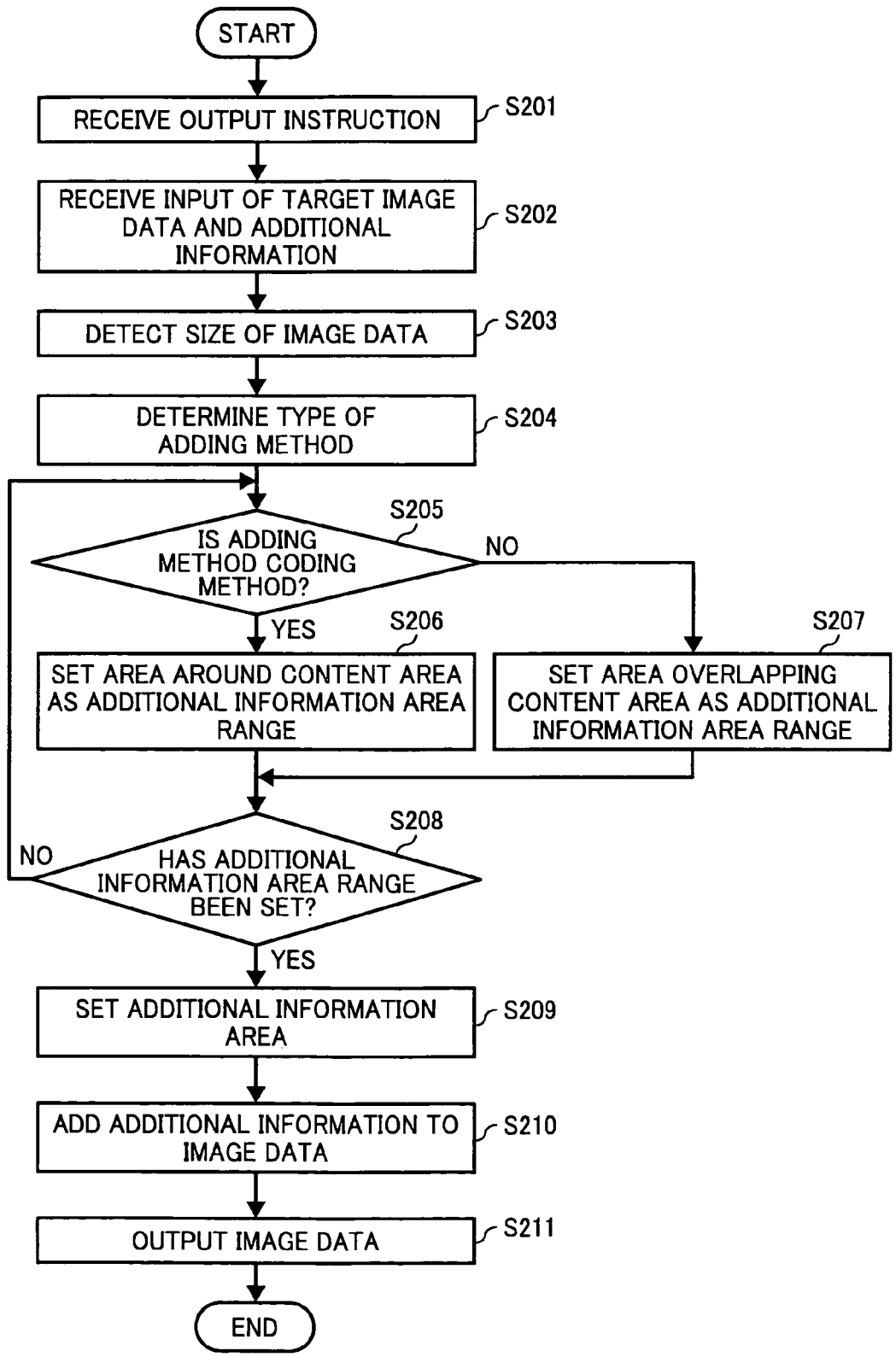
FIG. 12 is a flowchart of the operation of the image processing apparatus shown in FIG. 8.

FIG. 12 is a flowchart of the operation of the PC 300. The instruction input unit 410 receives an output instruction from a user (step S201). The instruction input unit 410 also receives an instruction for setting a mode in which additional information is added to image data (hereinafter, "mode setting instruction").

The data input unit 420 receives input of target image data and the additional information (step S202), and stores the image data in the storage unit 430. Subsequently, the size detecting unit 440 reads the image data from the storage unit 430 and detects the size of the image data (step S203). The information on the size of the image data is stored in the storage unit 230.

The obtaining unit 450 obtains identification information of an adding method by which the additional information is to be added to the target image data, and the determining unit 460 determines the type of the adding method based on the type of the additional information (step S204).

In the second embodiment, the process at steps S202 and S204 vary depending on the mode setting instruction received at step S201. The mode set at step S201 includes a mode in which intensity of the additional information has priority (hereinafter, "intensity-prioritized mode") and a mode in which an amount of the additional information has priority (hereinafter, "amount-prioritized mode").

Figure 13:
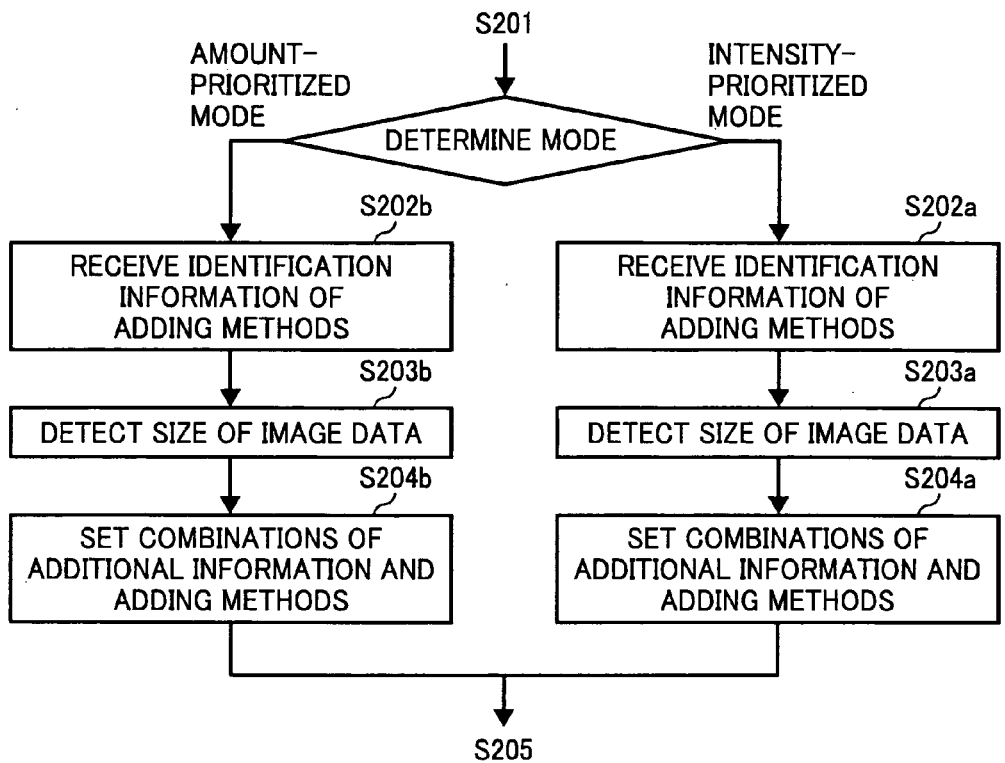
FIG. 13 is a flowchart of a process for receiving additional information.
Figure 14:
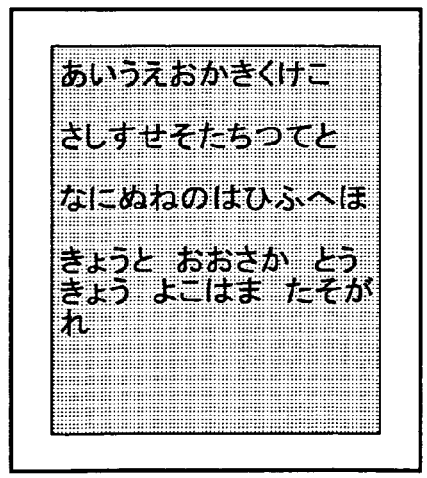
FIG. 14 is a schematic diagram of an example of image data to which additional information is added by a conventional method.

FIG. 13 is a detailed flowchart of the process from steps S202 to step S204 shown in FIG. 12. In the intensity-prioritized mode, the obtaining unit 450 receives a plurality of types of identification information of a plurality of adding methods by which a single type of additional information is to be added to the image data (step S202a). The adding-method identification information can be input by a user via the instruction input unit 410 realized by the user interface 360 or can be obtained from the storage unit 430. Thereafter, the size of the image data is detected (step S203a), and a plurality of combinations of the additional information and the adding methods is set (step S204a).

On the other hand, in the amount-prioritized mode, a plurality of types of additional information is generated or received, and the obtaining unit 450 receives the identification information of each adding method by which each type of additional information is to be added to the image data (step S202b). Thereafter, the size of the image data is detected (step S203b), and a plurality of combinations of the additional information and the adding methods is set (step S204b).

Based on each combination of additional information and adding method (on additional information type basis), a process for setting the additional information area is performed. The area setting unit 470 obtains a content area of the image data and sets an additional information area based on the content area and the type of adding method.

Determination is made on whether the adding method obtained by the obtaining unit 450 is the coding method (step S205). When the adding method is the coding method (YES at step S205), it is determined that a range of the additional information area is around the content area, i.e., the additional information area range is set (step S206), and information representing the additional information area range is stored in the storage unit 430. On the other hand, when the adding method is a method other than the coding method (No at step S205), the additional information area range is set within the content area (step S207). The information on the additional information area range is stored in the storage unit 430.

Thereafter, it is determined whether the additional information area range has been set with respect to all types of additional information (step S208). When the additional information area range has been set for all types of additional information, the process control goes to step S209. On the other hand, when the setting operation is not completed, the process control goes back to step S205, and the rest of the setting of the additional information area range is performed.

The area setting unit 470 sets the additional information area based on the additional information area range and the content area of the image data (step S209).

The information adding unit 480 superimposes a pattern on the additional information area to add the additional information to the image data (step S210). The data output unit 490 outputs the image data containing the additional information (step S211).

As explained above, the area setting unit 470 sets the additional information area based on the adding method and the content information for each type of additional information. Therefore, the predetermined level of visibility of the content information of the target image data can be kept and the efficiency of the additional information can be enhanced.

The PC 300 is explained as an example of an image processing apparatus of the second embodiment, while the MFP 100 is explained as an example of an image processing apparatus of the first embodiment. The second embodiment can be applied to the MFP 100 with the same effect, and vice versa.

The external storage unit 340 is not specifically limited. For example, a memory such as a SD card, a compact flash (trademark) memory card, a smart media (trademark), a memory stick (trademark), or a picture card, or any type of portable recording medium can be used in single or in combination as the external storage unit 340.

Each function explained above can be realized by a computer executable program that is written in a legacy programming language or an objective programming language such as an assembler, C, C++, C#, or Java (trademark). The program can be stored in a device-readable recording medium and distributed. The recording medium is, for example, a ROM, an EEPROM, an EPEOM, a flash memory, a flexible disk, a CD-ROM, a CD-RW, a DVD, a SD card, or a MO disk.

The image processing apparatus is not limited to the MFP 100 and the PC 300. Any apparatus that can communicate with a portable recording medium can be employed as an image processing apparatus depending on proposes. For example, a server, an image forming apparatus such as a copier or a printer, a mobile information terminal device such as a mobile phone, a personal digital assistant (PDA), or a portable electric game device, an image reading device such a scanner, an image shooting device such as a digital camera or a digital video camera, an audio image input-output (I/O) device such as a TV set, a HDD recorder, or an audio set, an vehicle-installed device such as a car navigation, or a digital home appliance can be employed.

As set forth hereinabove, according to an embodiment of the present invention, efficiency in extracting additional information can be enhanced while a predetermined level of visibility or appearance of content information can be ensured.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
   an obtaining unit that obtains an adding method by which additional information is to be added to image data in which content information is already contained;
   a setting unit that sets an area to which the additional information is to be added based on the adding method and the content information; and
   an adding unit that adds the additional information to the area by the adding method; wherein
   the adding method includes a watermark method adding a watermark pattern and a coding method adding code data as the additional information,
   the setting unit sets
      a content area, so as to contain the content information therein;
      a watermark area for adding the watermark pattern therein, so as to include the content area within the watermark area; and
      a code area, all around the watermark area, for adding the code data therein, so as not to overlap the content area, and so as for the code data not to overlap the watermark area, and wherein
   the additional information includes at least one of type information representing a type of the image data and record information representing an output record of the image data.

2. The image processing apparatus according to claim 1, further comprising a determining unit that determines the coding method and the watermark method as the adding method.

3. The image processing apparatus according to claim 1, wherein, when the additional information includes the type information, the setting unit sets the code area to which the type information is added as the additional information.

4. An image processing method using an image processing apparatus having an obtaining unit, a setting unit, and an adding unit, the image processing method comprising:
   obtaining an adding method by which additional information is to be added to image data, in which containing content information is already contained, by using the obtaining unit;
   setting an area to which the additional information is to be added based on the adding method and the content information by using the setting unit; and
   adding the additional information to the area by the adding method by using the adding unit; wherein
   the adding method includes a watermark method adding a watermark pattern and a coding method adding code data as the additional information,
   the setting sets
      a content area, so as to contain the content information therein;
      a watermark area for adding the watermark pattern therein, so as to include the content within the watermark area; and
      a code area, all around the watermark area, for adding the code data therein, so as not to overlap the content area, and so as for the code data not to overlap the watermark area, and wherein
   the additional information includes at least one of type information representing a type of the image data and record information representing an output record of the image data.

5. The image processing method according to claim 4, further comprising determining the coding method and the watermark method as the adding method.

6. The image processing method according to claim 4, wherein the additional information includes at least one of type information representing a type of the image data and record information representing an output record of the image data.

7. The image processing method according to claim 6, wherein, when the additional information includes the type information, the setting unit sets the code area to which the type information is added as the additional information.

8. A computer program product comprising a non-transitory computer usable medium having computer readable program codes embodied in the medium that, when executed, causes a computer to execute:
   obtaining an adding method by which additional information is to be added to image data, in which content information is already contained;
   setting an area to which the additional information is to be added based on the adding method and the content information; and
   adding the additional information to the area by the adding method; wherein
   the adding method includes a watermark method adding a watermark pattern and a coding method adding code data as the additional information,
   the setting sets
      a content area, so as to contain the content information therein;
      a watermark area for adding the watermark pattern therein, so as to include the content within the watermark area; and
      a code area, all around the watermark area, for adding the code data therein, so as not to overlap the content area, and so as for the code data not to overlap the watermark area, and wherein
   the additional information includes at least one of type information representing a type of the image data and record information representing an output record of the image data.

* * * * *

UNITED STATES PATENT AND TRADEMARK OFFICE
CERTIFICATE OF CORRECTION

| | |
|---|---|
| PATENT NO. | : 8,325,970 B2 |
| APPLICATION NO. | : 12/076393 |
| DATED | : December 4, 2012 |
| INVENTOR(S) | : Ishikawa et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1130 days.

Signed and Sealed this
Eighteenth Day of November, 2014

Michelle K. Lee
*Deputy Director of the United States Patent and Trademark Office*